United States Patent

Kienlen et al.

[11] 3,962,826
[45] June 15, 1976

[54] COLLAPSIBLE FLOWER STEM HOLDER

[75] Inventors: Loren C. Kienlen; Jack H. Poppler, both of Nisswa, Minn.

[73] Assignee: Doormaid, Inc., Nisswa, Minn.

[22] Filed: Aug. 23, 1974

[21] Appl. No.: 500,152

[52] U.S. Cl. .............................. 47/41.13; 248/27.8; 24/5
[51] Int. Cl.² ...................... A01G 5/04; A45F 5/08; A47G 29/00
[58] Field of Search ................................. 47/41–47; 248/27.8, 46, 150, 160, 163, 166, 188; 211/60 T; 24/107, 5

[56] References Cited
UNITED STATES PATENTS

| | | | |
|---|---|---|---|
| 646,364 | 3/1900 | Donnelly | 248/46 |
| 720,132 | 2/1903 | Green | 47/41.11 |
| 948,476 | 2/1910 | Daumeyer | 248/150 |
| 2,041,336 | 5/1936 | Hall | 24/107 |
| 2,126,766 | 8/1938 | Gerbermann | 47/41.11 |
| 2,386,306 | 10/1945 | Gardiner | 248/150 |
| 2,747,333 | 5/1956 | Erbguth | 47/41.13 |
| 2,813,712 | 11/1957 | Stanis | 24/107 |
| 2,881,562 | 4/1959 | Ragot | 47/41.13 |

FOREIGN PATENTS OR APPLICATIONS 1,585,530  1/1970  France .............................. 47/41.11

Primary Examiner—Edgar S. Burr
Assistant Examiner—James R. Feyrer
Attorney, Agent, or Firm—John W. Adams

[57] ABSTRACT

This is a collapsible flower stem holder which includes a pair of pivotally connected elongated arms, adapted to be collapsed for insertion through a narrow mouth vase and thereafter expanded into an operative position within the bottom of the vase and including a plurality of stem receiving holes in the portions of the arms which are elevated from the vase bottom to positively position the flower stem in the bottom of the vase.

3 Claims, 5 Drawing Figures

COLLAPSIBLE FLOWER STEM HOLDER

It is an object of the present invention to provide a holder for flower stems which is collapsible to permit insertion of the holder through the narrow mouth of a vase and thereafter permit expansion of the holder in the bottom of the vase to receive and position the bottom of the flower stems inserted into the vase.

It is another object to provide such a collapsible flower stem holder in which the stem positioning portions thereof are spaced above the bottom of the vase to receive and position the lower portions of the flower stems therein.

These and other objects and advantages of this invention will be apparent from the following description made in connection with the accompanying drawing wherein like reference characters refer to similar parts throughout the several views, and in which.

Figure 1:
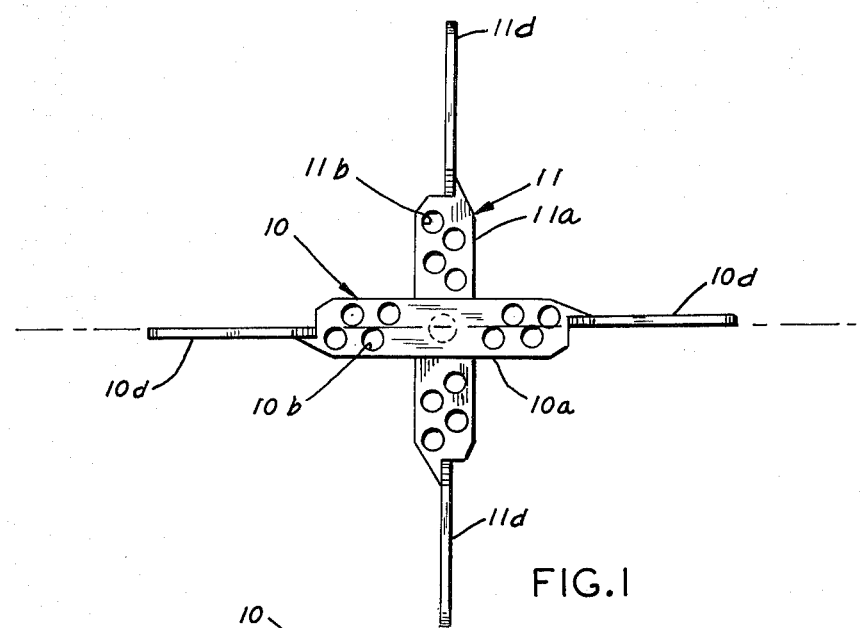
FIG. 1 is a top plan view of our flower holder in expanded position.
Figure 2:
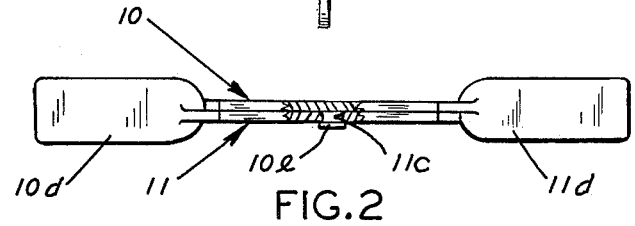
FIG. 2 is an exploded view of the two arms with portions thereof shown in vertical section.
Figure 3:
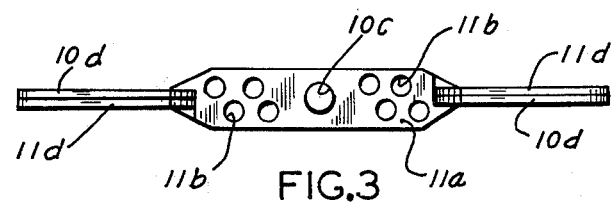
FIG. 3 is a bottom plan view of our collapsed flower holder.

As shown in the accompanying drawings, our flower holder consists of a pair of pivotally connected elongated arms 10 and 11. It is contemplated that these arms will be manufactured from any suitable molded plastic material known to craftsmen skilled in the molded plastic art which will not be subject to corrosion when subjected to submersion in water. Each of the arms has a flat, elevated, horizontally oriented portion. The oriented flower receiving portion respectively is designated by the reference characters 10a and 11a. These flat elevated portions have a plurality of flower receiving holes 10b and 11b formed therethrough. The center portions of the two arms 10 and 11 are pivotally mated as by a segmented pivot stub shaft 10c with each segment having an outwardly extending enlargement forming an enlarged retaining ring 10e around the lower end thereof. The stub shaft 10c extends downwardly from the flat center portion 10a of the arm 10. This pivot shaft 10c is received in a suitable aperture 11c formed in the central portion of the arm 11 and the plastic material from which the arms are made is sufficiently yieldable to provide a snap fit with the enlarged retaining ring 10 e around the lower end of the pivot shaft 10c.

The outer ends of the arms 10 and 11 have downwardly extending supporting elements 10d and 11d which engage the bottom of the flower vase and elevate the intermediate flat portion 10a and 11a to permit the lower ends of the stems to be received through the apertures 10b and 11b.

Figures 4, 5:
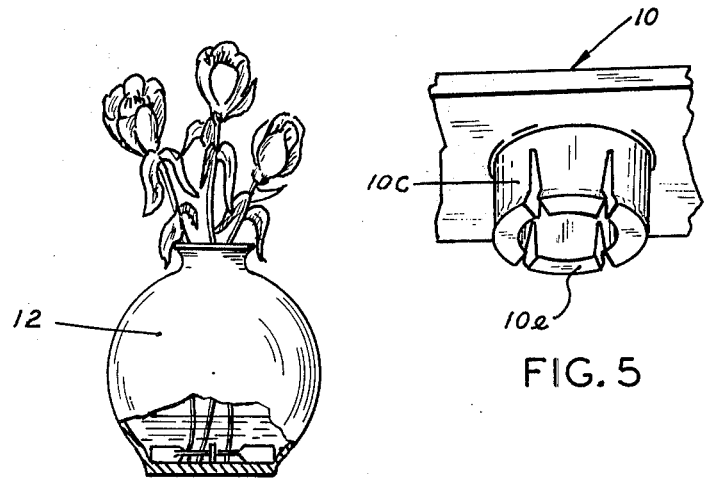
FIG. 4 is a perspective view of the flower holder in expanded operated position in the bottom of a narrow mouth vase with flowers contained therein; and, FIG. 5 is a fragmentary perspective view of the upper arm drawn to an enlarged scale and showing the segmented pivot stub shaft.

The flower holder can be packaged and stored in collapsed position, using up only a minimum of space and can be readily inserted through a vase 12 having a relatively narrow mouth and thereafter expanded into operative position within the enlarged bottom of the vase, as best shown in FIG. 4. In expanded operative position, the flat center portions 10a and 11a will be elevated above the bottom of the vase by the depending support elements 10d and 11d and the lower end portions of flower stems can be readily received within the apertures 10b and 11b of said flat flower holding portions. The ends of the arms engage the side walls of vase to limit the lateral movement and thereby maintain the flower stems in the desired position within the bottom of the vase.

It will be seen that we have provided a collapsible flower holder which can be inexpensively manufactured and which is particularly adapted for use with narrow necked flower vases such as that shown in FIG. 4.

It will be, of course, understood that various changes may be made in the form, details, arrangement and proportions of the parts without departing from the scope of this invention as set forth in the appended claims.

What is claimed is:

1. A holder for flower stems particularly designed for use in combination with a narrow mouth vase and comprising a pair of elongated arms each having a flat horizontally oriented central portion provided with stem receiving openings therethrough, a pair of generally flat downwardly extending supporting elements respectively provided at the end portions of said arms and disposed at generally right angles to said central horizontally oriented arm portions, pivot means connecting the central portions together to permit said arms to be collapsed with the flat supporting elements disposed in compact face-to-face relation to permit insertion into a narrow mouth vase when in collapsed position, said supporting elements engaging the bottom of the vase to elevate said apertured center portions of the arms above the bottom of the vase when said arms are expanded into operative position within said vase, the ends of said arms engaging the side walls of the vase to limit lateral movement of the expanded holder when positioned in the vase bottom.

2. The structure set forth in claim 1 and each of said arms being made from non-corroding plastic material each molded as an integral unit.

3. The structure set forth in claim 2 and one of said arms having a segmented pivot shaft, each segment having an outwardly extending enlargement to form an enlarged retaining ring around the end thereof, the other arm having a mating hole of a size to receive the ring therethrough in snapped fit relation.

* * * * *